(12) United States Patent
Dropps et al.

(10) Patent No.: US 7,719,969 B1
(45) Date of Patent: May 18, 2010

(54) SYSTEM AND METHOD FOR ASSIGNING NETWORK DEVICE PORT ADDRESS BASED ON LINK RATE

(75) Inventors: Frank R. Dropps, Maple Grove, MN (US); Edward McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 235 days.

(21) Appl. No.: 11/966,857

(22) Filed: Dec. 28, 2007

(51) Int. Cl.
*H04J 3/14* (2006.01)
*G08C 15/00* (2006.01)

(52) U.S. Cl. .................. 370/229; 370/431

(58) Field of Classification Search .......... None
See application file for complete search history.

(56) References Cited

U.S. PATENT DOCUMENTS

| | | | |
|---|---|---|---|
| 5,062,105 A | 10/1991 | McKnight et al. | |
| 6,654,838 B1 * | 11/2003 | Leonard | 710/240 |
| 7,076,569 B1 * | 7/2006 | Bailey et al. | 709/250 |
| 7,218,640 B2 | 5/2007 | Lebizay et al. | |
| 7,552,462 B2 * | 6/2009 | Segal | 725/119 |
| 2005/0018621 A1 | 1/2005 | Dropps et al. | |
| 2005/0018675 A1 | 1/2005 | Dropps et al. | |
| 2005/0030893 A1 | 2/2005 | Dropps et al. | |
| 2005/0094570 A1 * | 5/2005 | Berthy | 370/252 |
| 2006/0098573 A1 | 5/2006 | Beer et al. | |
| 2006/0268734 A1 * | 11/2006 | Heidari-Bateni et al. | 370/252 |
| 2008/0112430 A1 * | 5/2008 | Kwon et al. | 370/445 |
| 2008/0310306 A1 * | 12/2008 | Dropps et al. | 370/235 |
| 2009/0086637 A1 * | 4/2009 | DeCusatis et al. | 370/236.1 |

* cited by examiner

*Primary Examiner*—Min Jung
(74) *Attorney, Agent, or Firm*—Klein, O'Neill & Singh, LLP

(57) ABSTRACT

Method and system for assigning port addresses for a plurality of network devices based on a link rate associated with each network device is provided. The method includes discovering a link rate associated with each of the plurality of network devices; assigning a device address for each of the plurality of network devices, where at least a portion of the device address is selected based on the discovered link rate; assigning communication lanes among the plurality of network devices for network communication, wherein the communication lanes are assigned such that network devices with similar link rates use a same communication lane.

20 Claims, 4 Drawing Sheets

| Domain_ID 56 | Area_ID 58 | Port_ID 60 |
|---|---|---|
| Address Identifier 54 |||

# SYSTEM AND METHOD FOR ASSIGNING NETWORK DEVICE PORT ADDRESS BASED ON LINK RATE

BACKGROUND

1. Technical Field

The present invention relates to computer networks, and more particularly to systems and methods for assigning port addresses based on link rates.

2. Description of Related Art

Network devices are commonly used in computer networks for sending and receiving information. Examples of a network device, without limitation, include a switch, router, a host bus adapter (HBA), a host channel adapter (HCA), a network interface card, and others. Network devices typically include ports for receiving and transmitting information. Network ports may be coupled to links that operate at different speeds, for example, 1 gigabyte per second ("GB"), 2 GB, 4 GB, 8 GB and others. Network congestion may occur when a port coupled to a link that operates at a higher rate communicates with a network device coupled to a link that operates at a lower rate.

Network devices may use virtual lanes (VLs) to reduce network congestion. Each VL may have independent flow control. In conventional systems. VL assignment is not based on a link's ability to transmit and receive information. In some type of networks (for example, Fibre Channel based networks), the VLs are assigned based on a port's address. However, the port address assignment is not based on link rate and congestion can still occur within a given VL if the link rates are mixed at an Inter-Switch Link (ISL).

FIG. 1 illustrates this problem. The illustrated SAN 20 includes a first switch 22 and a second switch 24. A plurality of host bus adapters (HBAs) 26 are connected to ports 28 of the first switch 22 via links 21, 23 and 25, respectively. The links 21, 23 and 25 may operate at different rates. For example, link 21 may operate at 2 GB, link 25 may operate at 4 Gb and link 23 may operate at 8 GB.

A plurality of storage devices (also referred to as "target") 30 is connected to ports 28 of the second switch 24 via links 27, 29 and 31, respectively. The links 27, 29 and 31 connecting the storage devices 30 to switch 24 may operate at different speeds. For example, links 27 and 29 may operate at 2 Gb and link 31 may operate at 4 GB.

Switches 22 and 24 are operationally coupled via an Inter Switch Link (ISL) 34. The ISL 34 is shown as four lines for illustration purposes only and may be a single or multiple physical links using four independent buffer-to-buffer flow controls (i.e. virtual lanes). A plurality of VLs (for example, VL0, VL1. VL2 and VL3) 32 may be used for communication between switches 22 and 24. VLs 32 are assigned such that HBAs 26 and target 30 can communicate with each other. The VL 32 assignment is based on port address and port address assignment itself is not based on link rate. For example, a first virtual lane (VL0) may be assigned for communication between links 21 (2 GB) and 31 (4 GB); VL1 may be assigned to support communication between links 25 (4 GB) and 27 (2 GB). In conventional systems, there is no correlation between the VL assignment and a link's ability to transmit and receive information. Therefore, conventional systems are susceptible to congestion, there is a need for a method, and system for assigning port addresses such that lanes are assigned based on link rates.

SUMMARY

The preferred embodiments of the present system and methods for grouping devices in a computer network to decrease congestion in the network have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description", one will understand how the features of the present embodiments provide advantages, which include reducing congestion in the network to thereby improve overall network speed and performance.

In one embodiment, a method for assigning port addresses for a plurality of network devices based on a link rate associated with each network device is provided. The method includes discovering a link rate associated with each of the plurality of network devices; assigning a device address for each of the plurality of network devices, where at least a portion of the device address is selected based on the discovered link rate; assigning communication lanes among the plurality of network devices for network communication, wherein the communication lanes are assigned such that network devices with similar link rates use a same communication lane.

In another embodiment, a method for grouping devices in a computer network to decrease congestion in the network is provided. The method includes initializing network devices; collecting link rates for the network devices; and associating device link rates with routing parameters.

In yet another embodiment, a computer network including a plurality of devices communicating via a plurality of virtual lanes (VLs), each device being configured to operate at one of a plurality of link rates is provided. The network includes a first group of the devices configured to operate at a first one of the plurality of link rates; and a second group of the devices configured to operate at a second one of the plurality of link rates; wherein the devices in the first group are grouped together on a first VL, and the devices in the second group are grouped together on a second VL in order to decrease congestion in the network.

BRIEF DESCRIPTION OF THE DRAWINGS

The preferred embodiments of the present system and methods for grouping devices in a computer network to decrease congestion in the network now will be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION OF THE PREFERRED EMBODIMENTS

Figures 1, 3:
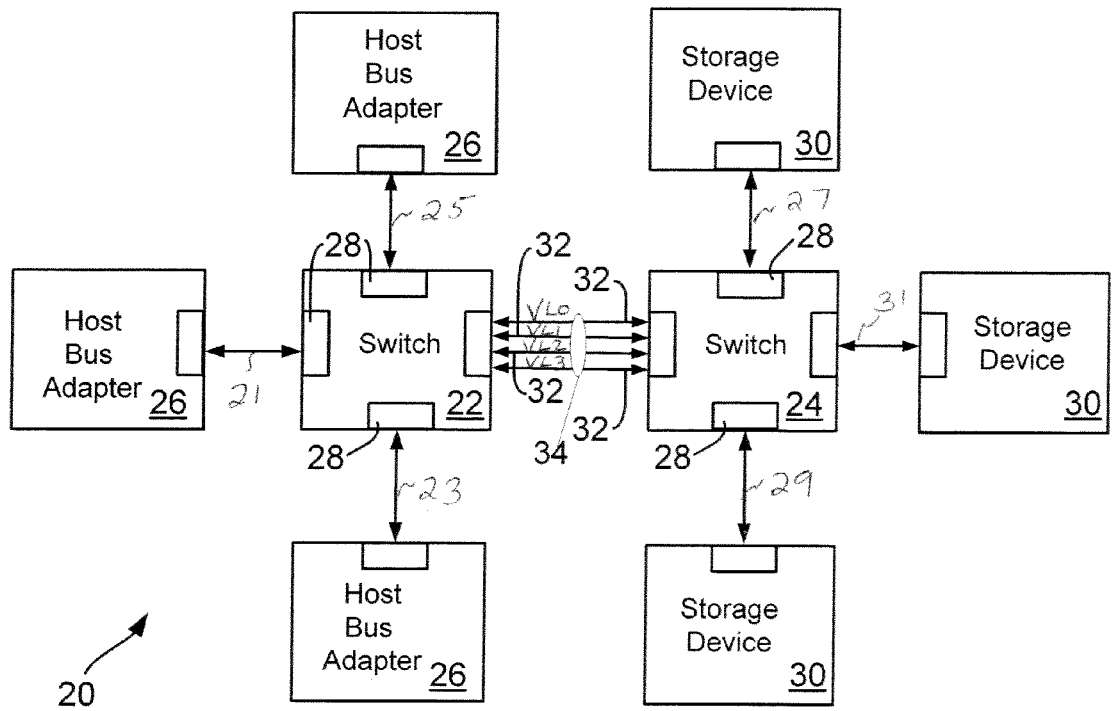
FIG. 1 is a functional block diagram of a typical Fibre Channel (FC) network.
FIG. 3 is a schematic representation of a standard 24-bit FC address identifier.

The following definitions are provided as they are typically (but not exclusively) used in the Fibre Channel environment, and implementing the various adaptive aspects of the present embodiments.

"D_ID": destination identifier.

"E_Port": a Fabric expansion port that attaches to another inter-connect port to create an Inter-Switch Link.

"F_Port": a port to which non-loop N_Ports are attached to a Fabric and does not include FL_ports.

"Fibre Channel ANSI Standard" ("FC-FS-2"): the Fibre Channel standard (incorporated herein by reference in its entirety) which describes the physical interface, transmission and signaling protocol of a high performance serial link for support of other high level protocols associated with IPI, SCSI, IP, ATM and others.

"Fabric": a structure or organization of a group of switches, target and host devices.

"Fabric Topology": a topology where a device is directly attached to a Fibre Channel Fabric that uses destination identifiers embedded in frame headers to route frames through a Fibre Channel Fabric to a desired destination.

"HBA": Host Bus Adapter.

"N_Port": a direct Fabric attached port, for example, a disk drive or HBA.

"Port": a general reference to an E_Port, F_Port or N_Port.

"SAN": Storage Area Network

"Switch": a Fabric element conforming to the Fibre Channel Switch standards.

To facilitate an understanding of the various embodiments of the present system and methods, the general architecture and operation of a network system will be described. The specific architecture and operation of the present embodiments will then be described with reference to the general architecture.

Various network protocols and standards are used to facilitate network communication. For example, Fibre Channel, c, Ethernet, Fibre Channel over Ethernet (FCOE) and others. These standards are briefly described below.

Fibre Channel: Fibre Channel is a set of American National Standards Institute (ANSI) standards, which provide a serial transmission protocol for storage and network protocols such as HIPPI, SCSI, IP, ATM and others. Fibre Channel supports three different topologies: point-to-point, arbitrated loop and Fabric. The point-to-point topology attaches two devices directly. The arbitrated loop topology attaches devices in a loop. The Fibre Channel Fabric topology attaches host systems directly to a Fabric, which is connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral. I/O subsystem, bridge, hub, router, or even another switch. A switch receives messages from various ports and routes them to other ports.

Ethernet: Ethernet is another common protocol that is used for network device communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The various embodiments described below may use Ethernet (which includes 100 Base-T and/or Gigabit Ethernet) as the network protocol.

InfiniBand: InfiniBand ("IB") is an industry standard for networks comprised of computers and/or input/output (I/O) devices. IB is typically being used in the High Performance Computing (HPC) environment. HPC environments typically create clusters of computers, with high performance characteristics. Large-scale HPC systems often encompass hundreds and even thousands of interconnected computers all working in parallel to solve complex problems.

Fibre Channel Over Ethernet (FCOE): FCOE is an upcoming standard that is being proposed to handle both Ethernet (network) and Fibre Channel (storage) traffic over an Ethernet link. The port assignment described below is applicable to an FCOE port that supports FCOE based communication.

It is noteworthy, that the adaptive embodiments disclosed herein are not limited to any particular protocol, as long as the functional goals are met by an existing or new network protocol.

Figure 2:
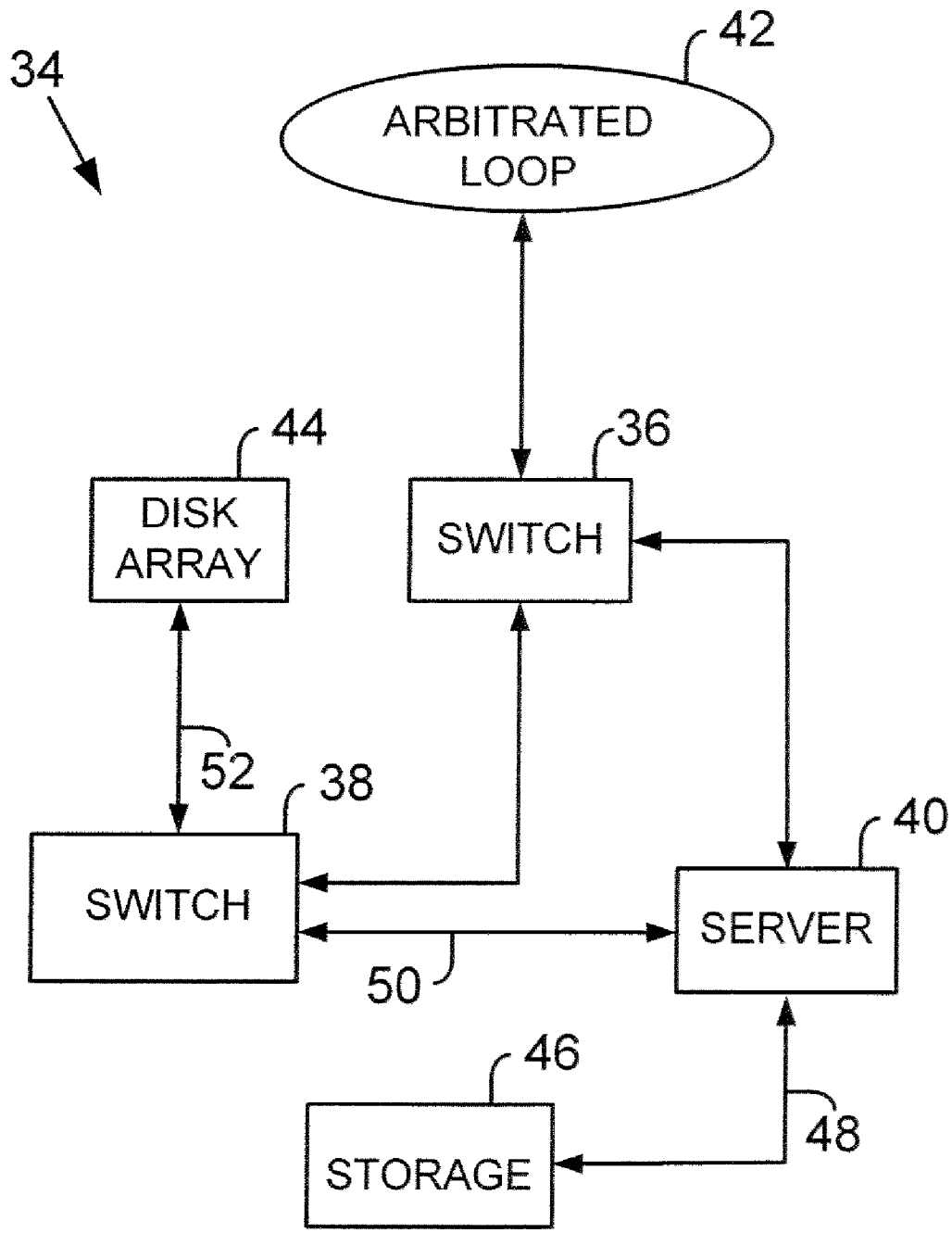
FIG. 2 is another functional block diagram of a typical FC network.

Network System:

FIG. 2 is a functional block diagram of a typical Fibre Channel network 34. The network 34 includes a plurality of interconnected devices. In the illustrated embodiment, the network 34 includes first and second switches 36, 38. The switches 36, 38 are coupled directly to one another. In addition, a server 40, and an arbitrated loop 42 are coupled directly to the first switch 36, and a disk array 44 is coupled directly to the second switch 38. Storage 46 is coupled to both switches 36, 38 through the server 40.

Each device in the network 34 includes one or more ports, which include, for example, node ports (N_Ports), Fabric ports (F_Ports), and expansion ports (E_Ports). Node ports may be located in node devices, such as the server 40, the disk array 44 and the storage device 46. Fabric ports are located in Fabric devices such as the switches 36, 38. The arbitrated loop 42 may be operationally coupled to the first switch 36 using arbitrated loop ports (FL_Ports).

The devices of FIG. 2 are operationally coupled via "links" or "paths." For example, a path 48 may be established between two N_ports, such as between the server 40 and storage 46. A packet-switched path may be established using multiple links 50, 52, such as between an N-Port in the server 40 and an N-Port in the disk array 44 through the second switch 38.

Fibre Channel Header Format:

In the Fibre Channel protocol, each network device includes a device address. FIG. 3 illustrates a standard 24-bit Fibre Channel address identifier 54. The address identifier 54 includes a Domain_ID 56, an Area_ID 58 and a Port_ID 60. The Domain_ID 56 comprises the upper 8 bits of a 24-bit Fibre Channel frame address. A Domain includes one or more Fibre Channel switches that have the same Domain_ID for all N_Ports and NL_Ports within or attached to the switches. If there is more than one switch in the Domain, then each switch within the Domain is directly connected via an Inter-Switch Link (ISL) to at least one other switch in the same Domain. The Area_ID 58 comprises the middle 8 bits of a 24-bit Fibre Channel address. The Area_ID 58 applies either to (a) one or more N_Ports within and attached to a Fibre Channel switch; or (b) an Arbitrated Loop of NL_Ports attached to a single FL_Port. The Port_ID 60 comprises the lower 8 bits of a 24-bit Fibre Channel address. The Port_ID 60 applies to either (a) a single N_Port or virtualized N_Port within a Domain/Area or (b) the valid arbitrated loop physical address (AL_PA) of a single NL_Port or FL_Port on an Arbitrated Loop.

Figure 4:
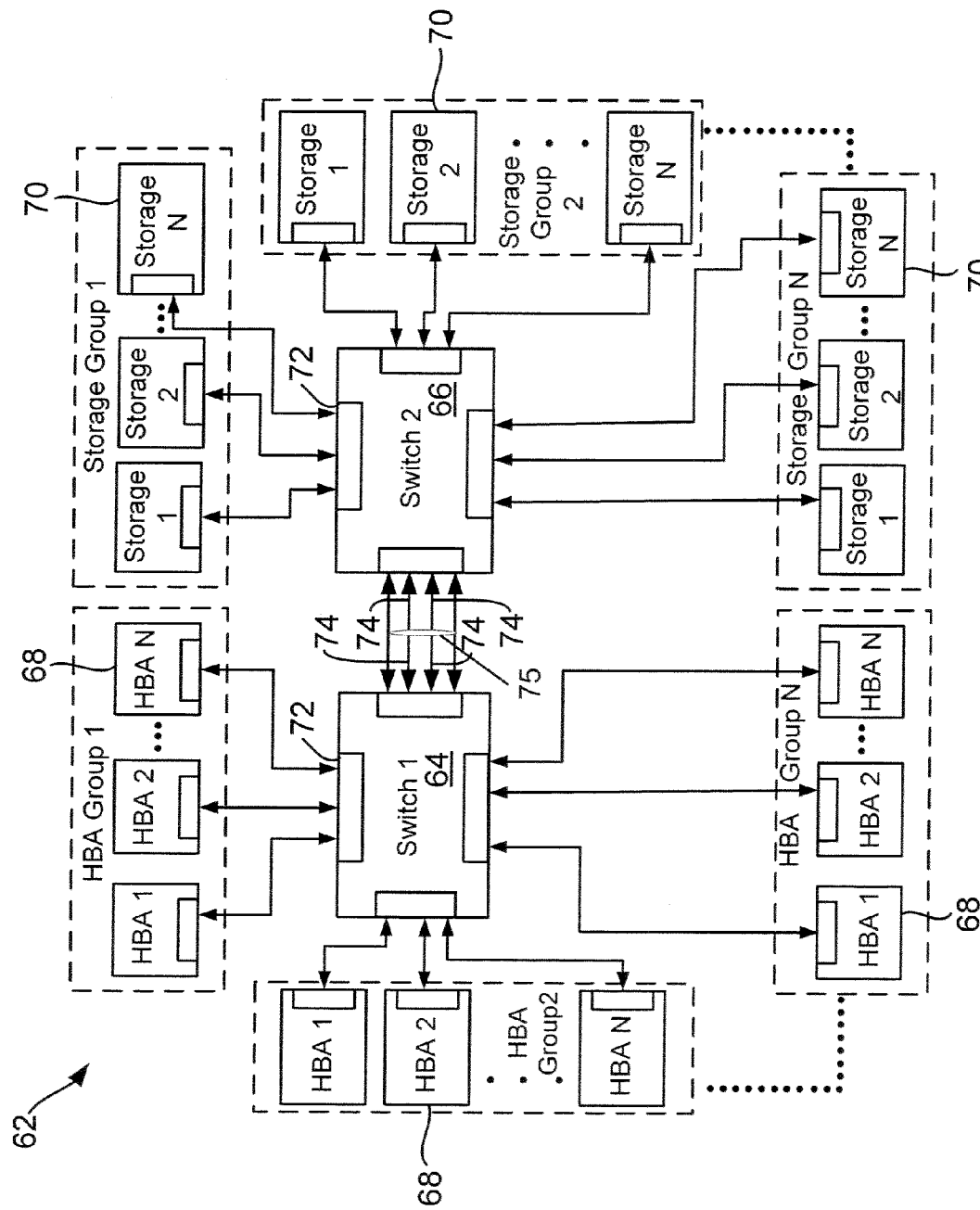
FIG. 4 is a functional block diagram of a FC network having characteristics and advantages of the present embodiments.

Fibre Channel Network:

FIG. 4 is a functional block diagram of a Fibre Channel network 62 having characteristics and advantages of the present embodiments. The network 62 includes a first switch 64 and a second switch 66. A plurality of devices is interconnected through switches 64, 66. In the illustrated embodiment, the interconnected devices comprise host bus adapters (HBAs (HBA$_1$ . . . HBA$_N$)) 68 and storage devices (Storage device$_1$ . . . Storage Device$_N$) 70. Each of the HBAs 68 is connected to a port 72 on the first switch 64, while each of the storage devices 70 is connected to a port 72 on the second switch 66.

Switches 64 and 66 are operationally coupled via ISL 75. A plurality of virtual lanes (VLs) 74 may be used by switches 64 and 66 to facilitate communication between the various devices. In FIG. 4, ISL 75 is shown as four lines with each line representing a virtual lane 74 for illustrative purposes. Thus, each of the HBAs 68 may communicate with any and all of the storage devices 70 through the switches 64, 66 and ISL 75. While FIG. 4 includes only HBAs 68 and storage devices 70, those of ordinary skill in the art will appreciate that the network 62 may comprise any device, such as, for example, HCAs. Further, while FIG. 4 shows four VLs 74 on ISL 75, the present embodiments may include any number of VLs 74.

The present embodiments comprise a system and methods for grouping devices in a computer network 62 to decrease congestion in the network 62. Thus, in the example embodiment illustrated in FIG. 4 the HBAs 68 are grouped into groups 1 through N, with each group including HBAs 1 through N, while the storage devices 70 are grouped into groups 1 through N, with each group including storage devices 1 through N. In one embodiment of the present system, every device in any given group has a common link rate. Thus, for example, in FIG. 4 all devices in HBA Group 1 may operate at 1 GB, while all devices in HBA Group 2 may operate at 2 GB, etc. Of course, the number used to designate a group does not necessarily indicate that group's link rate. Thus, for example, all devices in HBA Group 1 may operate at 4 GB or 8 GB or any other speed.

In the present embodiments, each device group connected to the first switch 64 is assigned to one of the VLs 74, and each device group connected to the second switch 66 is likewise assigned to one of the VLs 74. Devices in groups on opposite ends of the same VL 74 have the same link rate, and each VL 74 handles traffic at one link rate. Thus, for example, a first one of the VLs 74 may only handle traffic at 4 Gbps, while a second one of the VLs 74 may only handle traffic at 8 Gbps. Because all devices communicating on a given VL operate at the same link rate, slower devices cannot create congestion for faster devices.

In one embodiment, a device assignment process is provided. The process discovers device rates and assigns device addresses so that devices at the same link rate are mapped to the same VL 74. In one embodiment, a portion of a device address is designated for device assignment, so that for all devices operating at a given link rate this designated portion of the device address is identical. Because devices are assigned to VLs 74 based on their respective device addresses, devices having identical designated portions will be assigned to the same VL 74. For example, in a network 62 in which each device includes a standard 24-bit Fibre Channel address identifier, the device address assignment algorithm may designate one or more D_ID bits to be assigned according to the device link rate. The designated bits may be, for example, bits 9:8.

In this example then the following device address values may be assigned:

|  | Domain | Area | Port |
|---|---|---|---|
| 1 Gbps devices | XXXXXXXX$_b$ | XXXXXX00$_b$ | XXXXXXXX$_b$ |
| 2 Gbps devices | XXXXXXXX$_b$ | XXXXXX01$_b$ | XXXXXXXX$_b$ |
| 4 Gbps devices | XXXXXXXX$_b$ | XXXXXX10$_b$ | XXXXXXXX$_b$ |
| 8 Gbps devices | XXXXXXXX$_b$ | XXXXXX11$_b$ | XXXXXXXX$_b$ |

Again, in the present methods devices are assigned to VLs 74 based on their respective device addresses, and only with consideration for certain designated bits. In the above example those bits are D_ID bits 9:8. Thus, for all 1 Gbps devices D_ID bits 9:8 are 0:0. Since all 1 Gbps devices have D_ID bits 9:8 equal to 0:0, all 1 Gbps devices are assigned to the same VL. The same assignment algorithm applies to devices at different link rates, such as those at 2 Gbps, 4 Gbps and 8 Gbps in the above table. In a further aspect of the present embodiments, only devices operating at a given link rate are assigned to a given VL 74. Thus, for example, a first one of the VLs 74 handles traffic from only 1 Gbps devices, a second one of the VLs 74 handles traffic from only 2 Gbps devices, etc. Slower devices thus do not create congestion for faster devices, because they are assigned to different VLs 74.

In the above example, only D_ID bits 9:8 (portion of the Area_ID) are assigned with special consideration to the device link rate. The other 22 bits signified by Xs are assigned in another fashion. They could be assigned according to any algorithm, they just do not receive consideration based on the device link rate. Of course, in other embodiments additional and/or different D_ID bits could be assigned with consideration to the device link rate. The present system and methods are not to be understood as being limited to the example embodiment above in which only D_ID bits 9:8 are assigned with special consideration to the device link rate.

While in FIG. 4 all HBAs 68 are connected to the first switch 64 and all storage devices 70 are connected to the second switch 66, those of ordinary skill in the art will appreciate that in some embodiments one or more HBAs 68 may be connected to either or both of the first and second switches 64, 66 and one or more storage devices 70 may be connected to either or both of the first and second switches 64, 66. Further, FIG. 4 represents that the devices in each group are located in proximity to one another, and that the devices in each group are connected to a common port 72 on one of the switches. However, those of ordinary skill in the art will appreciate that FIG. 4 is merely a schematic. The physical locations of devices in FIG. 4 are not meant to imply that the devices in any given group occupy any particular relative locations. Further, devices in any given group may be connected to multiple ports 72 on either switch. And while FIG. 4 illustrates two switches with each including four ports 72, those of ordinary skill in the art will appreciate that the present embodiments may include any number of switches with each switch having any number of ports 72.

Figures 5, 6:
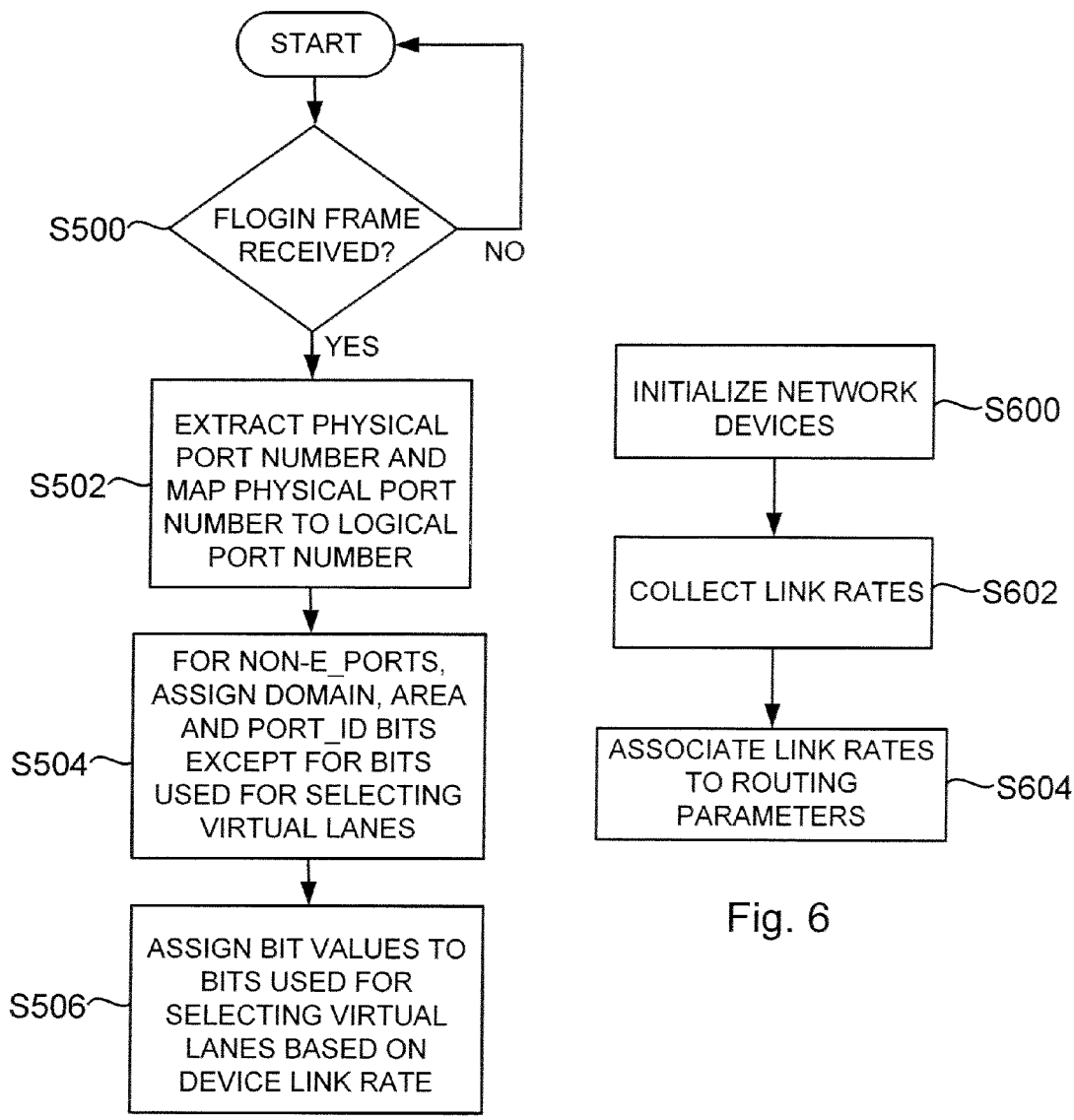
FIG. 5 is a process flow diagram illustrating one embodiment of the present methods for grouping devices in a computer network.
FIG. 6 is a process flow diagram illustrating another embodiment of the present methods for grouping devices in a computer network.

Process Flow:

FIG. 5 illustrates an example of a process flow according to one embodiment of the present methods for grouping devices in a computer network 62. The process of FIG. 5 is specific to Fibre Channel, but those of ordinary skill in the art will appreciate that the present embodiments are readily adaptable to other network protocols (for example, Ethernet, InfiniBand and Fibre Channel over Ethernet (FCOE), as explained in more detail below. With reference to FIG. 5, the process begins when a switch port 72 checks to see if a fabric login (FLOGI) frame has been received, as shown at step S500. The fabric login is a standard process in Fibre Channel used by network devices to login to a fabric. If an FLOGI frame has been received, the physical port number is extracted from the frame and mapped to a logical port number, as shown at step S502. In the next step, for non-E_ports, domain, area and Port_ID bits are assigned, except for those bits that are used for selecting virtual lanes, as shown at step S504. And in the next step, bit values are assigned to those bits used for selecting virtual lanes based on the link rate of the device, as shown at step S506. Those of ordinary skill in the art will appreciate that steps S504 and S506 could be performed in any order and could even be performed simultaneously. These steps maybe performed by a hardware state machine or by a software application running on a control processor.

In other network protocols, such as InfiniBand or Ethernet, the method of mapping devices to VLs may differ from the embodiment described above. For example, in InfiniBand the subnet manager may program the Service Level (SL) to VL mapping table based on the link rate. The virtual lanes used by the ports for transmitting data packets are based on the device link rate.

In Ethernet, the class of packets also referred to as priority may be assigned based on the link rate of the destination device. The assignment could also be based on the combination of source and destination device link rates or bandwidth capabilities.

The enclosed FIG. 6 provides a more generalized process flow of the present embodiments, one that is not specific to FC. With reference to FIG. 6, the process begins at step S600 by initializing network devices. In the next step, link rates for network devices are collected, as shown at step S602. In the next step, device link rates are associated with routing parameters, as shown at step S604.

The above description presents the best mode contemplated for carrying out the present system and methods for grouping devices in a computer network to decrease congestion in the network, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method for assigning port addresses for a plurality of network devices based on a link rate associated with each network device, comprising:
   discovering a link rate associated with each of the plurality of network devices;
   assigning port addresses for each of the plurality of network devices, where at least a portion of each port address is selected based on the discovered link rate; and
   assigning communication lanes among the plurality of network devices for network communication, wherein the communication lanes are assigned such that network devices with similar link rates use a same communication lane.

2. The method of claim 1, wherein the communication lanes are virtual lanes used by the plurality of network devices to communicate with each other in a Fibre Channel based network.

3. The method of claim 2, wherein the device address for a network device communicating in the Fibre Channel network includes an Area identifier (Area_ID) field, and at least a portion of Area_ID field is selected based on the discovered link rate.

4. The method of claim 3, wherein certain bits of a destination identifier (D_ID) for the network device are selected based on the discovered link rates.

5. The method of claim 2, wherein after a network device receives a fabric login frame, a physical port number is extracted from a Fibre Channel frame and the physical port number is mapped to a logical port number.

6. The method of claim 1, wherein the communication lanes are virtual lanes used in an InfiniBand network.

7. The method of claim 6, wherein a subnet manager assigns a service level to a virtual lane based on the discovered link rate.

8. The method of claim 1, wherein the plurality of network devices operate in an Ethernet network.

9. The method of claim 8, wherein an Ethernet packet class or priority is assigned based on the discovered link.

10. A method for grouping devices in a computer network to decrease congestion in the network, the method comprising the steps of:
    initializing network devices;
    collecting link rates for the network devices; and
    associating device link rates with routing parameters, thereby grouping the devices based on the link rate of each so that every device in a given group has a common link rate.

11. The method of claim 10, wherein the network is a Fibre Channel based network.

12. The method of claim 10, wherein the network is an InfiniBand based network.

13. The method of claim 10, wherein the network is an Ethernet based network.

14. The method of claim 10, wherein the network devices support Fibre Channel over Ethernet protocol.

15. A computer network including a plurality of devices communicating via a plurality of virtual lanes (VLs), each device being configured to operate at one of a plurality of link rates, the network comprising:
    a first group of the devices configured to operate at a first one of the plurality of link rates; and
    a second group of the devices configured to operate at a second one of the plurality of link rates;
    wherein the devices in the first group are grouped together on a first VL, and the devices in the second group are grouped together on a second VL in order to decrease congestion in the network.

16. The computer network of claim 15, wherein each device includes a device address, and for each device address at least a portion thereof is selected based on the link rate of that device.

17. The computer network of claim 16, wherein each device address portion is in an Area identifier (Area_ID) field of the device address.

18. The computer network of claim 16, wherein certain bits of a destination identifier (D_ID) for each device are selected based on the link rate for that device.

19. The computer network of claim 15, wherein the plurality of devices operate in an Ethernet network.

20. The computer network of claim 15, wherein the plurality of devices operate in an InfiniBand network.

* * * * *

UNITED STATES PATENT AND TRADEMARK OFFICE
CERTIFICATE OF CORRECTION

| | | |
|---|---|---|
| PATENT NO. | : 7,719,969 B1 | |
| APPLICATION NO. | : 11/966857 | |
| DATED | : May 18, 2010 | |
| INVENTOR(S) | : Frank R. Dropps et al. | |

It is certified that error appears in the above-identified patent and that said Letters Patent is hereby corrected as shown below:

In column 6, line 32, delete "Xs" and insert -- X's --, therefor.

Signed and Sealed this
Fourteenth Day of June, 2011

David J. Kappos
*Director of the United States Patent and Trademark Office*